US011516707B1

(12) United States Patent
Cai et al.

(10) Patent No.: US 11,516,707 B1
(45) Date of Patent: Nov. 29, 2022

(54) USER EQUIPMENT (UE) GROUP HANDOFF

(71) Applicant: T-Mobile Innovations LLC, Overland Park, KS (US)

(72) Inventors: Zheng Cai, Fairfax, VA (US); Zheng Fang, Mclean, VA (US); David Zhijun Sun, Broadlands, VA (US); Yu Wang, Fairfax, VA (US)

(73) Assignee: Sprint Communications Company LP, Overland Park, KS (US)

( * ) Notice: Subject to any disclaimer, the term of this patent is extended or adjusted under 35 U.S.C. 154(b) by 0 days.

(21) Appl. No.: 17/174,418

(22) Filed: Feb. 12, 2021

(51) Int. Cl.
*H04W 36/08* (2009.01)
*H04W 36/00* (2009.01)
*H04W 36/38* (2009.01)

(52) U.S. Cl.
CPC ....... *H04W 36/0009* (2018.08); *H04W 36/08* (2013.01); *H04W 36/38* (2013.01)

(58) Field of Classification Search
CPC .. H04W 36/0009; H04W 36/08; H04W 36/38
See application file for complete search history.

(56) References Cited

U.S. PATENT DOCUMENTS

| 11,051,220 B1 * | 6/2021 | Song | H04W 36/0007 |
| 11,445,558 B1 | 9/2022 | Cai et al. | |
| 2006/0084445 A1 * | 4/2006 | Minami | H04W 28/08 |
| | | | 455/450 |
| 2010/0214943 A1 * | 8/2010 | Immendorf | H04W 36/0085 |
| | | | 370/252 |
| 2012/0302240 A1 * | 11/2012 | Tamaki | H04W 36/0016 |
| | | | 455/436 |
| 2017/0208507 A1 * | 7/2017 | Wang | H04W 36/22 |
| 2018/0302824 A1 * | 10/2018 | Christopherson | H04W 48/18 |
| 2021/0068046 A1 * | 3/2021 | Mestanov | H04W 48/10 |
| 2022/0014900 A1 | 1/2022 | Gandhi et al. | |
| 2022/0030038 A1 * | 1/2022 | Condoluci | H04W 4/44 |

OTHER PUBLICATIONS

Cai, Zheng, et al., "Multi-active Electronic Subscriber Identity Module Profiles for Multi-service User Equipment," filed Nov. 17, 2020 U.S. Appl. No. 16/950,849.
Notice of Allowance dated May 19, 2022, filed Nov. 17, 2020 U.S. Appl. No. 16/950,849.
Cai, Zheng, et al., "Multi-active Electronic Subscriber Identity Module Profiles for Multi-service User Equipment," filed Jul. 25, 2022 U.S. Appl. No. 17/872,411.

* cited by examiner

*Primary Examiner* — Barry W Taylor

(57) ABSTRACT

A cell site configured to perform group user equipment (UE) handoffs. The cell site comprises an application stored in a non-transitory memory that when executed by a processor of the cell site determines that a first UE is to be handed-off, determines that the first UE is a member of a UE group, wherein the UE group comprises the first UE and at least one other different UE, determines radio resources consumed by the UE group, identifies a second cell site that has sufficient idle radio resources to provide the radio resources consumed by the UE group, and sends a handoff message via the radio transceiver to the second cell site, wherein the handoff message identifies each of the UEs that are members of the UE group, whereby the plurality of UEs that are members of the UE group are handed-off as a group to the second cell site.

14 Claims, 8 Drawing Sheets

USER EQUIPMENT (UE) GROUP HANDOFF

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user equipment (UE) may be provided with mobile wireless communication service by the UE attaching to a first cell site, the UE receiving a first wireless communication link from the first cell site, the UE conducting communications via the first wireless communication link, the first cell site handing the UE off to a second cell site, the UE receiving a second wireless communication link from the second cell site, and the UE continuing conducting communications via the second wireless communication link. The handing off of wireless links between cell sites to maintain an in-progress wireless communication session of the UE is typically done transparently to the user of the UE. Occasionally hiccups occur, as for example when a call may drop during a handoff. But in the absence of such a call drop, most users would say they cannot discern when their calls are handed-off between cell sites, such is the robust reliability of conventional UE handoff.

SUMMARY

In an embodiment, a method of handing-off a plurality of user equipments (UEs) being served by a first cell site to a second cell site as a group is described. The method comprises determining by an application executing on a processor at a first cell site that a first user equipment (UE) is to be handed-off, wherein the first cell site is associated with a first multi-operator core network (MOCN), determining by the application that the first UE is a member of a UE group receiving wireless connectivity from the first cell site, wherein the UE group comprises the first UE and at least one other different UE, and determining radio resources consumed by the UE group by the application based on summing the radio resources provided by the first cell site that are consumed by each of the UEs that are members of the UE group. The method further comprises identifying by the application a plurality of cell sites which each have sufficient idle radio resources to provide the radio resources consumed by the UE group and, for each of the plurality of cell sites identified, determining by the application a MOCN to which the cell site is associated. The method further comprises selecting by the application a second cell site from among the plurality of cell sites identified that is associated with the first MOCN and sending a handoff message by the application to the second cell site, wherein the handoff message identifies each of the UEs that are members of the UE group, whereby the first cell site hands-off the plurality of UEs that are members of the UE group as a group to the second cell site.

In another embodiment, a cell site configured to perform group user equipment (UE) handoffs is disclosed. The cell site comprises an antenna set, a radio transceiver coupled to the antenna set, a non-transitory memory, a processor communicatively coupled to the non-transitory memory and to the radio transceiver, and an application stored in the non-transitory memory. When executed by the processor the application determines that a first user equipment (UE) receiving a wireless link from the radio transceiver is to be handed-off, determines that the first UE is a member of a UE group receiving wireless connectivity from the radio transceiver, wherein the UE group comprises the first UE and at least one other different UE, and determines radio resources provided by the radio transceiver consumed by the UE group. When executed by the processor, the application further identifies a second cell site that has sufficient idle radio resources to provide the radio resources consumed by the UE group and sends a handoff message via the radio transceiver to the second cell site, wherein the handoff message identifies each of the UEs that are members of the UE group, whereby the plurality of UEs that are members of the UE group are handed-off as a group to the second cell site.

In yet another embodiment, a method of handing-off a plurality of user equipments (UEs) being served by a first cell site to a second cell site as a group is disclosed. The method comprises determining by an application executing on a processor at a first cell site that a first user equipment (UE) is to be handed-off, determining by the application that the first UE is a member of a UE group receiving wireless connectivity from the first cell site, wherein the UE group comprises the first UE and at least one other different UE, and determining radio resources consumed by the UE group by the application based on summing the radio resources provided by the first cell site that are consumed by each of the UEs that are members of the UE group. The method further comprises identifying by the application a second cell site that has sufficient idle radio resources to provide the radio resources consumed by the UE group and sending a handoff message by the application to the second cell site, wherein the handoff message identifies each of the UEs that are members of the UE group, whereby the first cell site hands-off the plurality of UEs that are members of the UE group as a group to the second cell site.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
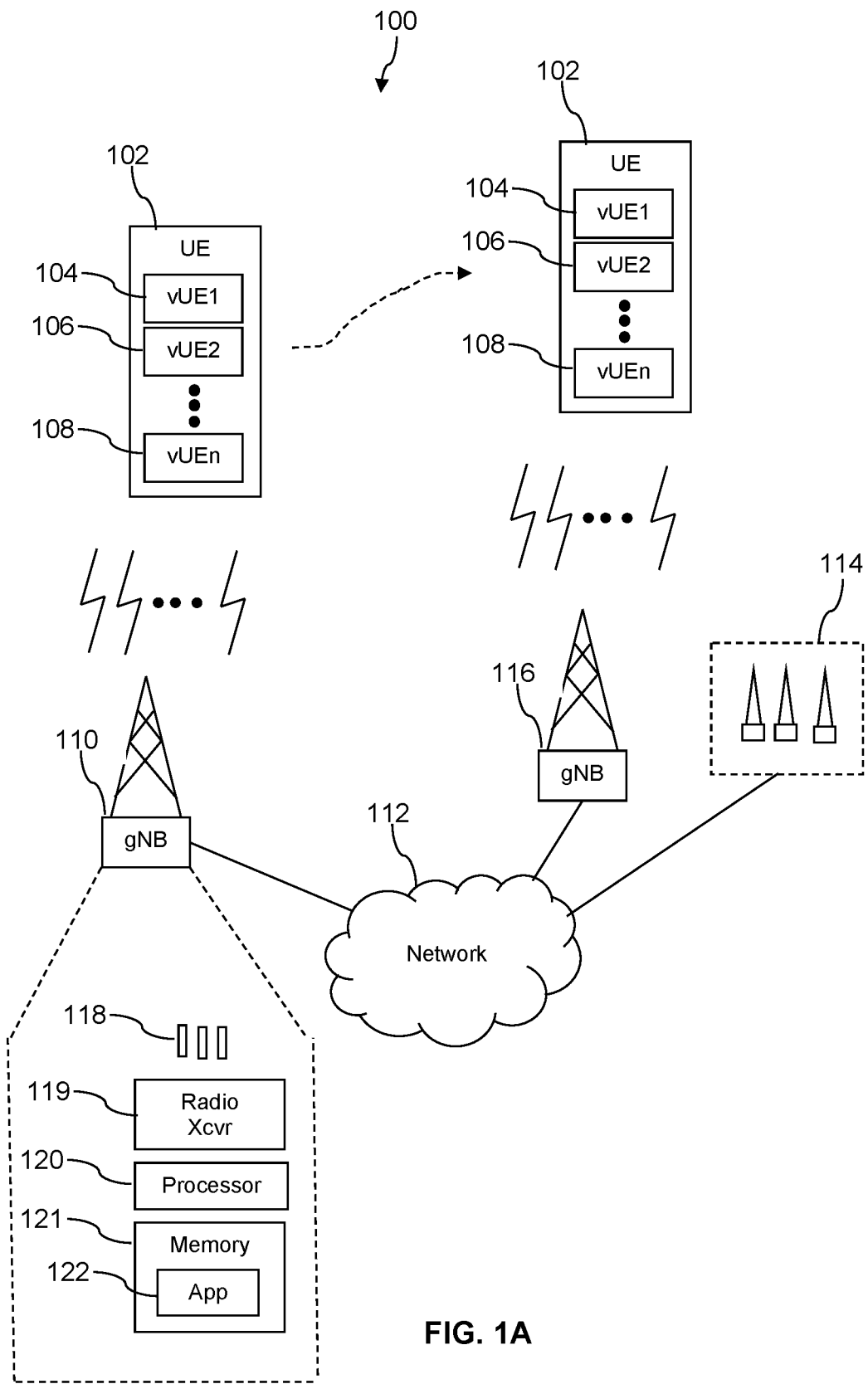
FIG. 1A is a block diagram of a first aspect of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches group handoff of a plurality of user equipments (UEs) by a first cell site to a second cell site at substantially the same time. A plurality of UEs may be established as a UE group for various reasons. In one scenario, the UEs may identify themselves as members of a common UE group to the first cell site. In another scenario, however, the first cell site on its own initiative may allocate the plurality of UEs to a common UE group. When the first cell site considers handing off any UE that is a member of a UE group (e.g., a received signal strength measurement or a channel quality indicator (CQI) measurement indicates the subject UE is moving out-of-range of the first cell site), the first cell site analyzes the handoff based on the rule that if any UE that is a member of a UE group is to be handed-off, all the UEs that are members of that same UE group are handed-off at substantially the same time and to the same second cell site. Thus, the handoff analysis by the first cell site may determine not to handoff a UE when it is a member of a UE group under circumstances where otherwise it would handoff the UE if it were not a member of the UE group. For example, other members of the UE group may not be associated with a low received signal strength measurement or with a low CQI measurement. The handoff analysis by the first cell site additionally takes into consideration whether the second cell site can handle the concurrent handoff of all the UEs that are members of the common UE group. Thus, in some circumstances, UE handoff may handoff the plurality of UEs to a second cell site that is less optimal (e.g., in terms of proximity to the first cell site and/or for reasons of received signal strength or CQI measurements) than a third cell site because the third cell site at the moment may not have the radio resources available to handle all of the UEs that are members of the subject UE group.

The group handoff of a plurality of UEs from a first cell site to a second site taught herein is at least one particular technical solution to a technical problem. Some physical UEs may in fact support two or more virtual UEs, where each virtual UE is treated by the cell sites as independent UEs. When any one of the plurality of virtual UEs supported by the same physical UE is to be handed-off (e.g., the first cell site determines by executing a handoff decision algorithm to handoff the virtual UE), all the virtual UEs supported by the same physical UE ought to be handed-off at substantially the same time and to the same second cell site. The group handoff of a plurality of UEs taught herein provides a particular technical solution for this technical problem. When a second, third, fourth, or yet additional virtual UEs request a wireless link from a cell site, the previously unattached virtual UE provides information associating itself to the common UE group (e.g., the UE group associated with the physical UE by which it is supported).

A virtual UE may be executed on a physical UE as a software process performing the wireless communication functions of a conventional UE. Each different virtual UE on a same physical UE may be associated with a different international mobile subscriber identity (IMSI, e.g., a telephone number), a different IP address, and different network access credentials but shares the same mobile equipment identity (MEID) that attaches to the same physical UE. For more details about a plurality of virtual UEs supported by a single physical UE, see U.S. patent application Ser. No. 16/950,849, filed Nov. 17, 2020, titled "Multi-active Electronic Subscriber Identity Module Profiles for Multi-service User Equipment," by Zheng Cai, et al., which is incorporated by reference herein in its entirety.

In an embodiment, UEs can indicate to a cell site that they are grouped, and the cell site takes cognizance of the grouping when performing a UE handoff. For example, a first virtual UE supported on a physical UE requests to attach to a cell site and indicates a first IMSI associated with the first virtual UE and an MEID associated with the physical UE. A second virtual UE supported on the same physical UE requests to attach to the cell site and indicates a second IMSI that is associated with the second virtual UE and the MEID associated with the physical UE—the same MEID provided by the first virtual UE. In an embodiment, the virtual UEs request to attach and provide their IMSI and MEID with a radio resource control (RRC) connection request message. It is noted that ordinarily (e.g., without the benefit of the teachings herein) the cell site would not deem the first virtual UE and the second virtual UE to be associated together and would not attempt to interwork with them in a collective way, because the association of these virtual UEs to the same underlying physical UE is transparent to the cell site. In this case, however, the cell site can infer that the first virtual UE and the second virtual UE are members of a common UE group because they both are associated with the same MEID—both are supported on the same physical UE. In an embodiment, the second virtual UE may set a flag in its connection request indicating it is a member of a UE group, whereby to reduce the burden on the cell site of analyzing every attachment request to determine if it might be associated with a UE group.

After attachment of UEs to the cell site, the cell site can track UE groups and membership of UEs in the UE groups in a variety of different ways. In an embodiment, a cell site may maintain a list of UE contexts—one UE context data structure for each UE (including both virtual UEs and physical UEs that do not support a virtual UE)—and a list of UE groups—one UE group data structure for each UE group. Each UE context comprises information about the subject UE such as its IMSI, MEID, and other information. If a UE is a member of a UE group, its UE context comprises a UE group pointer that identifies a UE group. If a UE is not a member of a UE group, its UE context does not comprise a UE group pointer or the UE group pointer stores a null value, an invalid value, or a 0 value. Each UE group data structure comprises one or more UE context pointer, where each UE context pointer identifies a UE context. Thus, when the cell site determines that a UE is ready to be handed-off, it can access its UE context in the UE contexts list. If the UE is not a member of a UE group, as indicated by analysis of its UE context data structure, the cell site performs conventional handoff of the UE. If the UE is a member of a UE group, as indicated by a valid UE group pointer in the UE context, the cell site looks up the UE group data structure pointed to by the UE group pointer in the UE context. The cell site then determines what other UEs are members of the subject UE group. Having easily identified the UEs that are members of the subject UE group and gained access to their UE contexts, the cell site can analyze the needfulness of a group UE handoff and either perform the group UE handoff or defer group handoff in light of the circumstances of the other UEs that are members of the same UE group. It is understood that in other embodiments other ways of tracking UE groups and membership of UEs in the UE groups may be employed.

A cell site under some circumstances may desirably associate a plurality of UEs to a common UE group on its own initiative. For example, a cell site may be transitioning to a maintenance mode of operation and desires to reduce its current allocation of radio resources to UEs. To accomplish this, the cell site may complete handoff of a plurality of UEs to a proximate cell site. Rather than perform the handoff conventionally, one handoff procedure at a time for each separate UE, the cell site as taught herein may first allocate a plurality of UEs to a common UE group and then conduct a group handoff procedure to migrate this plurality of UEs to a second cell site, whereby to reduce allocation of its radio resources and transition to maintenance mode of operation. The cell site may analyze the radio environment of 50 UEs attached to the cell site, select 25 of these 50 UEs to be handed-off, group 8 of the selected 25 UEs for group handoff to a second cell site, group a different 8 of the selected 25 UEs for group handoff to a third cell site, and group the remaining 9 of the selected 25 UEs for group handoff to a fourth cell site, and then perform a sequence of three group handoffs rather than 25 conventional handoffs. The group handoff of a plurality of UEs taught herein provides a particular technical solution for this technical problem.

A cell site may define UE groups on its own initiate for other reasons as well. For example, the cell site may define a UE group that corresponds to a plurality of UEs associated with a high quality of service (QoS) policy, whereby to promote delivering a high quality of service to these UEs. Alternatively, the cell site may define a UE group that corresponds to a plurality of UEs associated with a non-qualified (either medium QoS or low QoS or standard QoS) QoS, whereby to promote handing off the UEs that are members of the non-qualified QoS UE group, thereby recovering radio resources from those handed-off UEs that can be used to increase or sustain the QoS of the remaining UEs attached to the cell site. A cell site may define a UE group on its own initiative when a radio resource overload condition occurs, whereby to promptly and efficiently mitigate the overload, for example by handing-off ¼ of the UEs receiving wireless coverage from a same coverage sector of the cell site to an adjacent cell site that is proximate that coverage sector.

When arranging a group UE handoff, the cell site determines the totality of radio resources it is currently providing to the group of UEs and identifies target handoff cell sites that are currently able to support that totality of radio resources. For example, suppose a first virtual UE supported by a physical UE consumes 50 MBPS data and a second virtual UE supported by the same physical UE consumes 100 MBPS. The cell site composes a list of target handoff cell sites that can currently provide the aggregate of 150 MBPS in radio resources needed by the two virtual UEs. The cell site may analyze other resources consumed by the group of UEs, for example user plane function (UPF) support, and may consider the ability of target handoff cell sites to provide equal UPF support for the UE group to be handed-off when composing the list of target handoff cell sites. The cell site selects the most suitable cell site from the target list and then hands-off the two virtual UEs to the selected cell site at substantially the same time. In an embodiment, the cell site may further transfer appropriate entries from its UE context list and the entry from its UE group list. For example, the handover message that the cell site sends to the selected target handover cell site includes information identifying the plurality of UEs that are in the UE group and information about the radio resources currently being consumed by those UEs. The handover message may further carry information about how many UPFs are associated with these UEs.

When the target cell site is served by a different local data center—e.g., when near the border of regions served by different data centers—the target cell site selection process takes into consideration core network operation. While abstractly viewed as a single entity, in fact the core network may be implemented by a plurality or regional data centers. Specifically the user plane function (UPF) of the core network may be different in different regional data centers, and consequently group UE handoff desirably takes into account this handing off of UPF when near a regional boundary. With this in mind, a target cell site that does not involve transition of the UE group into a different UPF provided by a different regional data center may be preferred by the target cell site selection process over an alternative target cell site that does entail transition of the UE group into a different UPF provided by a different regional data center.

In an embodiment, evaluating target cell sites may build in a preference for retaining the UE group UPF within the same multi-operator core network (MOCN). Different operators may share cell sites. In choosing target handoff cell sites the target cell sites desirably may be selected from the same MOCN as the source cell site. Sometimes different UEs in a UE group are supported by different MOCNs. For example, a first virtual UE on a first physical UE is supported by a first MOCN supported by the first cell site, and a second virtual UE on the first physical UE is supported by a second MOCN supported by the first cell site. When considering which target cell site to handoff this example to, the cell site would desirably exclude—if possible—a cell site that does not support both the first MOCN and the second MOCN.

Turning now to FIG. 1A. a communication system 100 is described. In an embodiment, the system 100 comprises a first physical UE 102 that supports or executes a first virtual UE 104, a second virtual UE 106, and a third virtual UE 108. Each of the virtual UEs 104, 106, 108 receives a separate wireless communication link from a first cell site 110 that provides connectivity to the network 112. For example, the first cell site 110 may provide a first wireless link to the first virtual UE 104 via a first radio channel and be received by a first antenna of the first physical UE 102, the first cell site 110 may provide a second wireless link to the second virtual UE 106 via a second radio channel and be received by a second antenna of the first physical UE 102, and the first cell site 110 may provide a third wireless link to the third virtual UE 108 via a third radio channel and be received by a third antenna of the first physical UE 102. In an embodiment, the first, second, and third wireless link may be established between the first cell site 110 and a single antenna of the first physical UE 102, where the first physical UE 102 may segregate the three wireless links based on frequency separation (e.g., frequency division multiplexing) and/or based on time separation (e.g., time division multiplexing). The first physical UE 102 may be a mobile phone, a smart phone, a personal digital assistant (PDA), a wearable computer, a headset computer, a laptop computer, a notebook computer, a tablet computer, or an Internet of things (IoT) device. The network 112 comprises one or more private networks, one or more public networks, or a combination thereof.

As the first physical UE 102 moves, for example while a user of the physical UE 102 drives or rides in a motor vehicle, the first physical UE 102 may move out of radio coverage of the first cell site 110 and into radio coverage of other cell sites 114, for example a second cell site 116. Since the virtual UEs 104, 106, 108 are co-located on the same first physical UE 102, it is desirable that when the first cell site 110 determines that any of the virtual UEs 104, 106, 108 are to be handed-off, all of the virtual UEs 104, 106, 108 should be handed-off at the same time and to the same one of the other cell sites 114, for example all handed-off to the second cell site 116. In an embodiment, the virtual UEs 104, 106, 108 may self-designate themselves as a UE group. The cell sites 110, 114, 116 may perform handoff of UEs in a UE group differently than how they perform handoff of a UE that is not a member of a UE group.

In an embodiment, the first cell site 110 comprises an antenna set 118, a radio transceiver 119, a processor 120, and a memory 121 comprising an application 122. In an embodiment, the application 122 may be stored in a non-transitory portion of the memory 121. All of the cell sites 114, 116 likewise comprise corresponding components (e.g., an antenna set, a radio transceiver, a processor a memory with the application). The processor 120 may execute the application 122 to determine when and how to handoff the virtual UEs 104, 106, 108. It is understood that the handoff analysis is different for handing off a virtual UE 104, 106, 108 that is deemed a member of a UE group versus the handoff analysis for an independent conventional UE.

Figure 1B:
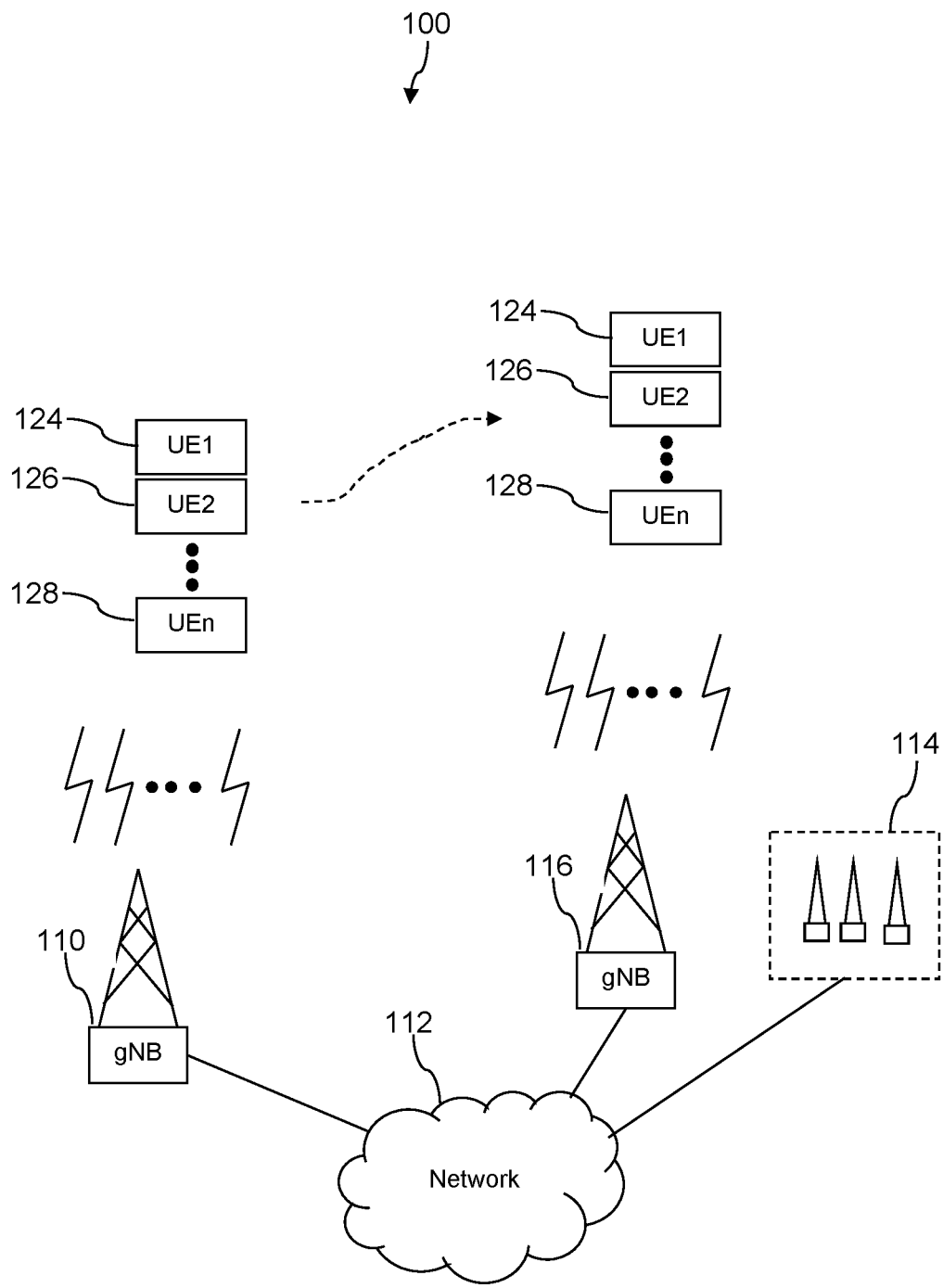
FIG. 1B is a block diagram of a second aspect of a communication system according to an embodiment of the disclosure.

Turning now to FIG. 1B, a different aspect of the communication system 100 is described. In an embodiment, the first cell site 110 may designate a plurality of UEs to be members of a common UE group on its own initiative. For example, the first cell site 110 may designate a second physical UE 124, a third physical UE 126, and a fourth physical UE 128 to be members of a common UE group. When the first cell site 110 determines to handoff any of the physical UEs 124, 126, 128 it is desirable that it hands-off all the physical UEs 124, 126, 128 at the same time and to the same cell site 114, for example to the second cell site 116. It is understood that a UE group may comprise members that are physical UEs that do not support any virtual UEs at the same time it comprises members that are virtual UEs.

With reference to both FIG. 1A and FIG. 1B, the application 122 in evaluating whether to handoff any UE 104, 106, 108, 124, 126, 128 takes into consideration that the subject UE is a member of a UE group. For example, if the first virtual UE 104 is reporting a diminished channel quality indicator (CQI) value, the application 122 might ordinarily initiate handoff of the first virtual UE 104. Here, however, because the first virtual UE 104 is a member of a UE group—along with second virtual UE 106 and third virtual UE 108—the application 122 would also take into consideration the CQIs and radio environment experienced by the second virtual UE 106 and the third virtual UE 108. If they are likewise experiencing a degraded radio environment, the application 122 may handoff these virtual UEs 104, 106, 108 to the second cell site 116. Alternatively, if for some reason, to the contrary, the virtual UEs 106, 108 are not experiencing a degraded radio environment, the application 122 may defer handoff of virtual UEs 104, 106, 108.

The application 122 also takes into consideration the ability of the target cell site to provide the radio needs of the UEs that are members of a UE group before handoff. For example, if the first virtual UE 104 is consuming 40 MBPS of data throughput, the second virtual UE 106 is consuming 100 MBPS of data throughput, and the third UE 108 is consuming 30 MBPS of data throughput, the target cell site must have idle resources of at least the sum of this data throughput—thus 170 MBPS of idle data throughput available for use by the virtual UEs 104, 106, 108. In some circumstances, this may involve handing-off the UEs of a UE group to a cell site that is less proximate to the original cell site than another cell site that does not currently have the data throughput to support the current usage of the UEs in the UE group.

The cell site 110 may take consider other factors in selecting a target cell site to handoff the UE group to. For example, the cell site 110 may take into consideration the ability of the target cell site to support the UPFs associated with the UEs in the UE group. For example, the cell site 110 may take into consideration a region and/or data center associated with the target cell site in comparison to a region and/or data center associated with the cell site 110 (e.g., a data center providing core network support to the cell site 110). For example, the cell site 110 may take into consideration one or more MOCNs that the UEs that are members of the UE group are associated with and seek target cell sites that support the same one or more MOCNs.

Figure 2:
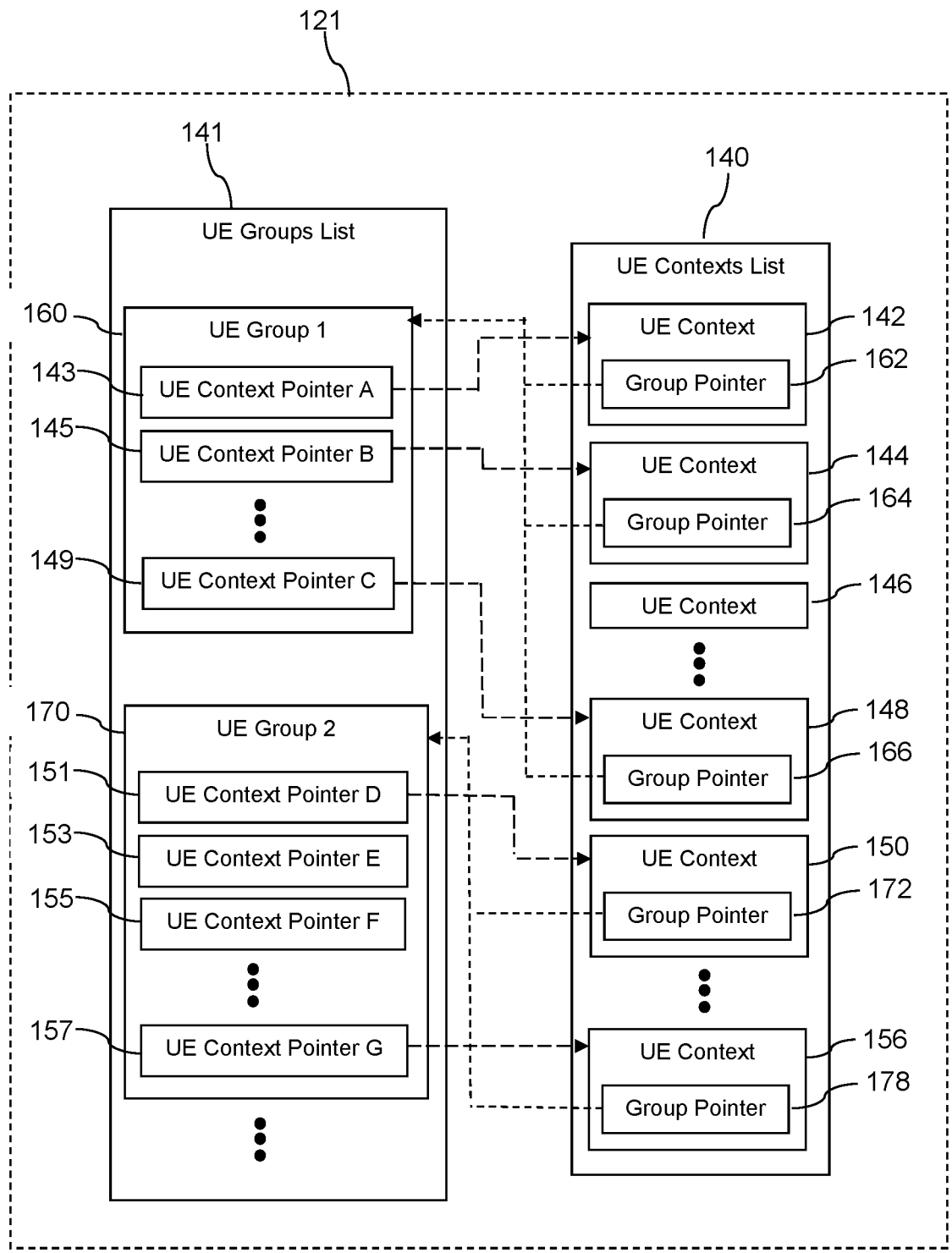
FIG. 2 is a block diagram of data structures according to an embodiment of the disclosure.

Turning now to FIG. 2, exemplary data structures used by the application 122 and/or the cell sites 110, 114, 116 to manage UE groups are discussed. It will be appreciated that in another embodiment, different data structures and/or processes may be used to manage the handoff of UE groups. In an embodiment, the first cell site 110 (and other cell sites 114, 116 pursuant to managing UE groups attached to them) stores a UE context list data structure 140 and a UE groups list data structure 141 in its memory 121. The UE contexts list 140, when the cell site 110 is providing wireless communication links to UEs, comprises one or more UE context entries. The UE groups list 141, when the cell site 110 is managing at least one UE group, comprises one or more UE group entries.

As illustrated in FIG. 2, the UE contexts list 140 comprises a first UE context 142 comprising a first UE group pointer 162, a second UE context 144 comprising a second UE group pointer 164, a third UE context 146 that does NOT comprise a UE group pointer (e.g., because the third UE context 146 is associated with a UE that is not a member of a UE group), a fourth UE context 148 comprising a third UE group pointer 166, a fifth UE context 150 comprising a fourth UE group pointer 172, and a sixth UE context 156 comprising a fifth UE group pointer 178. It is understood that the UE contexts list 140 may comprise any number of UE contexts. FIG. 2 illustrates a relatively small number of UE contexts to simplify the drawing and discussion. In practice, every UE (virtual UE and/or physical UE) attached to a cell site may have a corresponding UE context entry in the UE contexts list 140, and a cell site may support as many as 50 concurrent UEs at one time or more.

As illustrated in FIG. 2, the UE groups list 141 comprises a first UE group entry 160 and a second UE group entry 170. The first UE group entry 160 is associated with or defines a first UE group. The second UE group entry 170 is associated with or defines a second UE group. Each UE group entry comprises one or more UE context pointer associated with each UE that is a member of the associated group. The UE context pointer points to or references a UE context entry associated with a UE. For example, the first UE group entry 160 comprises a first UE context pointer 143 that references the first UE context 142, a second UE context pointer 145 that references the second UE context 144, and a third UE context pointer 149 that references the fourth UE context 148. Note that the third UE context pointer 149 does NOT reference the third UE context 146. The third UE context 146 is associated with a UE that is not a member of a UE group. It is possible that the UE associated with the third UE context 146 attached to the cell site 110 prior in time to the establishment of the fourth UE context 148 (e.g., because a third virtual UE associated with the fourth UE context 148 was instantiated after the physical UE associated with the third UE context 146 attached to the cell site 110).

The second UE group entry 170 comprises a fourth UE context pointer 151 that references the fifth UE context entry 150, a fifth UE context pointer 153 that references a different UE context entry (not shown), a sixth UE context pointer 155 that references a different UE context entry (not shown), and a seventh UE context pointer 157 that references the sixth UE context entry 156. It is understood that any UE group entry 160, 170 may comprise any number of UE context pointers but that the number of UE context pointers in each UE group entry 160, 170 matches the number of UEs (either virtual UEs or physical UEs) that are members of the UE group associated with that UE group entry 160, 170. Each UE context pointer may contain an address in the memory 121 that is associated with a UE context, for example a starting address of a block of memory that contains the UE context. Alternatively, each UE context pointer may contain a name or identifier of a corresponding UE context.

Each UE context 142, 144, 146, 148, 150, 156 comprises conventional information about a wireless link provided to the UEs. This conventional information may comprise an IMSI associated with the UE, an identification of radio resources provided to the UE, information about a UPF associated with the UE, information about a MOCN associated with the UE, and other information related to the management of the wireless link. The UE group pointers 162, 164, 166, 172, 178 are not conventional and are taught by the present disclosure for use in managing the UE group handoffs taught by the present disclosure. The UE group pointers 162, 164, 166, 172, 178 each comprises a pointer or reference to a UE group entry 160, 170 that the UE associated with the subject UE context is a member of.

The first UE context 142 may be associated with the first virtual UE 104, the second UE context 144 may be associated with the second virtual UE 106, and the fourth UE context 148 may be associated with the third virtual UE 108. Each of the virtual UEs 104, 106, 108 are members of a common UE group, a UE group managed using the first UE group entry 160. The UE group pointer 162, 164, 166 of these UE contexts 104, 106, 108 may all contain substantially the same value because they each refer to the same UE group entry 160. In an embodiment, the UE group pointer comprises an address associated with a location in memory associated with a corresponding UE group entry, for example a start address of a block of memory containing the UE group entry. Alternatively, the UE group pointer may comprise a name of a UE group entry.

In an embodiment, when the application 122 determines that a given UE (either a virtual UE or a physical UE) is eligible for handing-off, the application 122 finds the UE context associated with the handoff eligible UE in the UE contexts list 140. The application 122 may determine that the subject UE is eligible for handoff because of a CQI provided by the UE or because of a received signal strength of the subject UE determined by the cell site 110 (e.g., low CQI or low received signal strength may be construed as meaning the subject UE is moving out of the coverage area of the cell site 110). If the subject UE context has no group pointer, the application 122 infers the handoff eligible UE is not a member of a UE group and initiates a conventional handoff process for the subject UE. By contrast, if the subject UE context has a group pointer, the application 122 infers the handoff eligible UE is a member of a UE group, and in this case the evaluation of the handoff decision to be made by the application 122 needs to take into account the other members of the UE group in addition to the handoff eligible UE. The application 122 uses the value stored in the group pointer of the subject UE context to identify the UE group entry associated with the group the subject UE is a member of. The application 122 then reads the other UE context pointers in the UE group entry. The application 122 uses these other UE context pointers to access the UE context of each of the other UEs that are members of the same UE group. The application 122 can then evaluate all the contexts of the UEs that are members of the common UE group of which the handoff eligible UE is a member.

When a virtual UE is instantiated by a physical UE it may request a wireless attachment from the cell site 110 via a radio resource control (RRC) connect request message or via a different request message. In this RRC connect request message the virtual UE may indicate to the cell site 110 that it is a member of a UE group. In an embodiment, the RRC connect request message comprises the IMSI and the MEID of the virtual UE. Each different virtual UE may be assigned a different IMSI (e.g., telephone number) but virtual UEs that are supported by the same physical UE will have the same MEID, because the MEID attaches to the physical UE. The cell site 110, for example the application 122, can infer that the virtual UE is a member of a UE group by searching its UE contexts list 140 to see if another UE context entry has an identical MEID. Alternatively, the virtual UE may include a flag or other indication in the RRC connect request message that signals that it is a member of a UE group. In this case, the cell site 110, for example the application 122, can avoid searching the UE contexts list 140 for every RRC connect request and only search when in fact the RRC connect request identifies a virtual UE that is a member of a UE group.

When the application 122 determines that a virtual UE is attaching and is a member of a UE group it finds a UE context entry in the UE contexts list 140 that has the same MEID of the newly attaching virtual UE, it creates a new UE context entry for the newly attached virtual UE, it creates a group pointer in that new UE context entry, and it assigns to the group pointer of the new UE context entry the value stored by the group pointer of the UE context entry looked up earlier that has the same MEID. The application 122 also follows the group pointer to the associated UE group entry, creates a new UE context pointer entry in that associated UE group entry, and gives this new UE context pointer entry a value that points to or references the UE context entry newly added to the UE contexts list 140. When a virtual UE detaches, as for example when an application executing on a physical UE associated with the virtual UE terminates, the application 122 reverses this process. The application 122, when a virtual UE detaches, finds the UE context of the detaching virtual UE, accesses the group pointer in that UE context, accesses the UE group entry in the UE groups list pointed to, searches the UE context pointers in the subject UE group entry to find the UE context pointer referencing the UE context entry of the detaching virtual UE, it deletes that UE context pointer from the UE group entry, and then it deletes the UE context entry of the virtual UE that is detaching. A virtual UE may detach from the first cell site 110 because an application executing on the physical UE associated with the virtual UE may be terminating. Likewise, a physical UE may detach from the cell site 110 because the physical UE is powering down or entering an airplane mode of operation.

In the description above of the dynamic extension and contraction of the UE contexts list 140 and of the UE groups list 141, the activity was triggered by the initiative of virtual UEs. In an embodiment, the application 122 may of its own accord assign UEs to a common UE group, for example to transition to a maintenance mode by handing off a plurality of UEs to adjacent cell sites. In this case, the application 122 may first identify a plurality of UE contexts that are not currently associated with a UE group, for example by traversing the contexts list 140 searching for UE context entries that do not have a group pointer. The application 122 may determine to assign UEs to a UE group based on a roughly common location of those UEs—each of the UEs is located in the same section coverage area of the antenna set 118, for example. The application can make these UEs members of a UE group by creating a new UE group entry in the UE groups list 141, adding a group pointer that references the newly added UE group entry in each of the UE contexts of the UE members being added to this UE group, and creating UE context pointers in the newly added UE group entry, where each of these created UE context pointers references a different one of the UE contexts added to the newly created UE group. In an embodiment, when the application 122 and/or the cell site 110 hands-off a UE group to a different cell site 114, 116, the application 122 sends information to the other cell site that promotes ease of adding the appropriate entries to its own UE contexts list 140 and its own UE groups list 141. In an embodiment, the application 122 may simply send a copy over to the other cell site, and the corresponding application 122 at that cell site may modify these entries by revising the group pointer values and the UE context pointer values.

Figure 3:
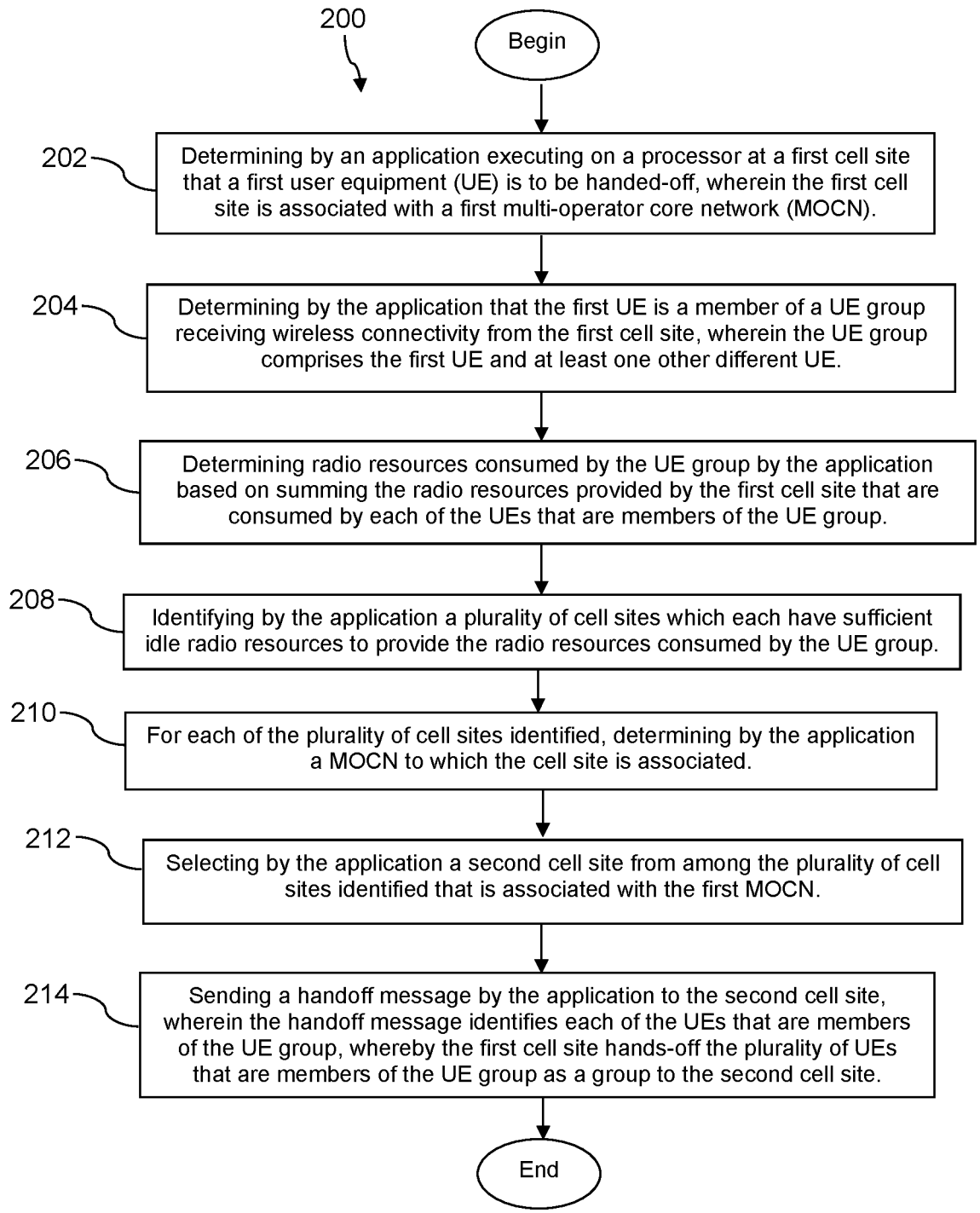
FIG. 3 is a flow chart of a method according to an embodiment of the disclosure.

Turning now to FIG. 3, a method 200 is described. In an embodiment, the method 200 is a method of handing-off a plurality of user equipments (UEs) being served by a first cell site to a second cell site as a group. At block 202, the method 200 comprises determining by an application executing on a processor at a first cell site that a first user equipment (UE) is to be handed-off, wherein the first cell site is associated with a first multi-operator core network (MOCN). In an embodiment, the first UE is a physical UE. A physical UE may be one of be a mobile phone, a smart phone, a personal digital assistant (PDA), a wearable computer, a headset computer, a laptop computer, a notebook computer, a tablet computer, or an Internet of things (IoT) device. In another embodiment, the first UE is a virtual UE, for example a virtual UE process that executes on a physical UE.

At block 204, the method 200 comprises determining by the application that the first UE is a member of a UE group receiving wireless connectivity from the first cell site, wherein the UE group comprises the first UE and at least one other different UE. In an embodiment, the at least one different UE comprises a physical UE. In another embodiment, the at least one different UE comprises a virtual UE. In an embodiment, the at least one different UE comprises a second UE that is a physical UE and a third UE that is a virtual UE. At block 206, the method 200 comprises determining radio resources consumed by the UE group by the application based on summing the radio resources provided by the first cell site that are consumed by each of the UEs that are members of the UE group.

At block 208, the method 200 comprises identifying by the application a plurality of cell sites which each have sufficient idle radio resources to provide the radio resources consumed by the UE group. At block 210, the method 200 comprises, for each of the plurality of cell sites identified, determining by the application a MOCN to which the cell site is associated.

At block 212, the method 200 comprises selecting by the application a second cell site from among the plurality of cell sites identified that is associated with the first MOCN. At block 214, the method 200 comprises sending a handoff message by the application to the second cell site, wherein the handoff message identifies each of the UEs that are members of the UE group, whereby the first cell site hands-off the plurality of UEs that are members of the UE group as a group to the second cell site.

In an embodiment, the method further comprises analyzing by the application a plurality of radio environment measurements of a plurality of UEs receiving wireless communication coverage from the first cell site; based on analyzing the radio environment measurements, creating the UE group by the application; and adding the first UE and the at least one other different UE to the UE group by the application. Creating the UE group may comprise adding a new UE group entry by the application to a UE groups list data structure in a memory of the first cell site, adding the first UE to the UE group may comprise creating a group pointer entry that references the new UE group entry by the application in a UE context associated with the first UE in a UE contexts list, and adding at the least one other different UE to the UE group may comprise creating a group pointer entry that references the new UE group entry by the application in a UE context associated with the at least one other different UE.

Figure 4:
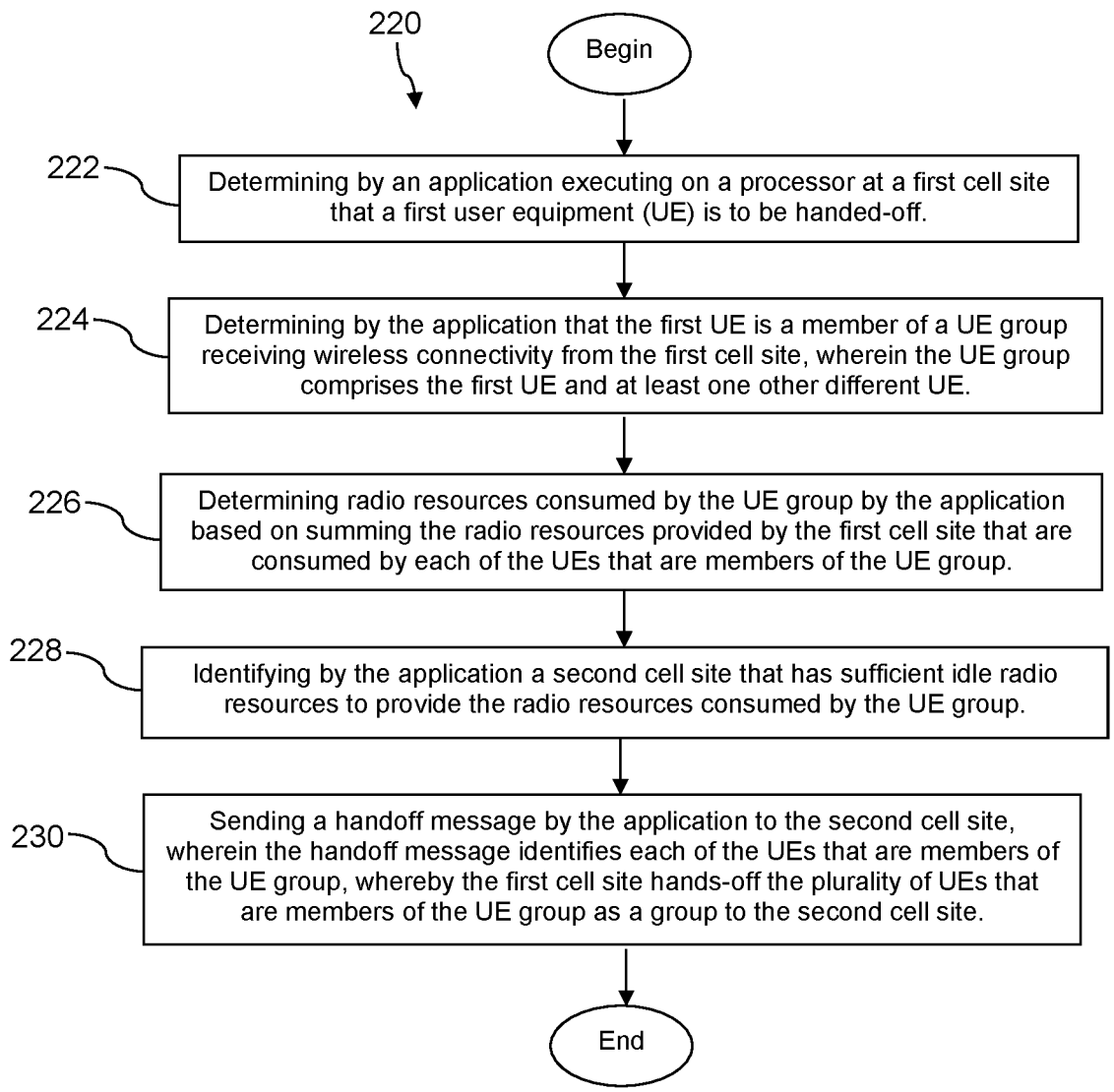
FIG. 4 is a flow chart of another method according to an embodiment of the disclosure.

Turning now to FIG. 4, a method 220 is described. In an embodiment, the method 220 is a method of handing-off a plurality of user equipments (UEs) being served by a first cell site to a second cell site as a group. At block 222, the method 220 comprises determining by an application executing on a processor at a first cell site that a first user equipment (UE) is to be handed-off.

At block 224, the method 220 comprises determining by the application that the first UE is a member of a UE group receiving wireless connectivity from the first cell site, wherein the UE group comprises the first UE and at least one other different UE. In an embodiment, the first UE is a physical UE and the at least one other different UE is a virtual UE supported by a physical UE different from the first UE. In an embodiment, the method 220 further comprises, in response to determining that the first UE is to be handed-off, reading by the application a UE context entry associated with the first UE in a UE contexts list data structure stored by the first cell site; reading a group pointer entry in the UE context entry associated with the first UE by the application, whereby the application determines that the first UE is a member of the UE group; and reading by the application a UE group entry in a UE groups list data structure stored by the first cell site, wherein the application accesses the UE group entry based on reading the group pointer entry and wherein the UE group entry comprises a first UE context pointer that references the UE context of the first UE and at least one other UE context pointer that references at least one UE context associated with the at least one other different UE, whereby the application determines that the at least one other different UE is a member of the UE group. The reading the UE context, reading the group pointer, and the reading the UE group entry may be actions whereby the application determines that the first UE is a member of a UE group and further determines other members of the UE group.

At block 226, the method 220 comprises determining radio resources consumed by the UE group by the application based on summing the radio resources provided by the first cell site that are consumed by each of the UEs that are members of the UE group. In an embodiment, the application determines radio resources consumed by the UE group by determining the megabits per second of data throughput consumed by the first UE and by the at least one other different UE and summing these data throughputs.

At block 228, the method 220 comprises identifying by the application a second cell site that has sufficient idle radio resources to provide the radio resources consumed by the UE group. At block 230, the method 220 comprises sending a handoff message by the application to the second cell site, wherein the handoff message identifies each of the UEs that are members of the UE group, whereby the first cell site hands-off the plurality of UEs that are members of the UE group as a group to the second cell site.

Figure 5A:
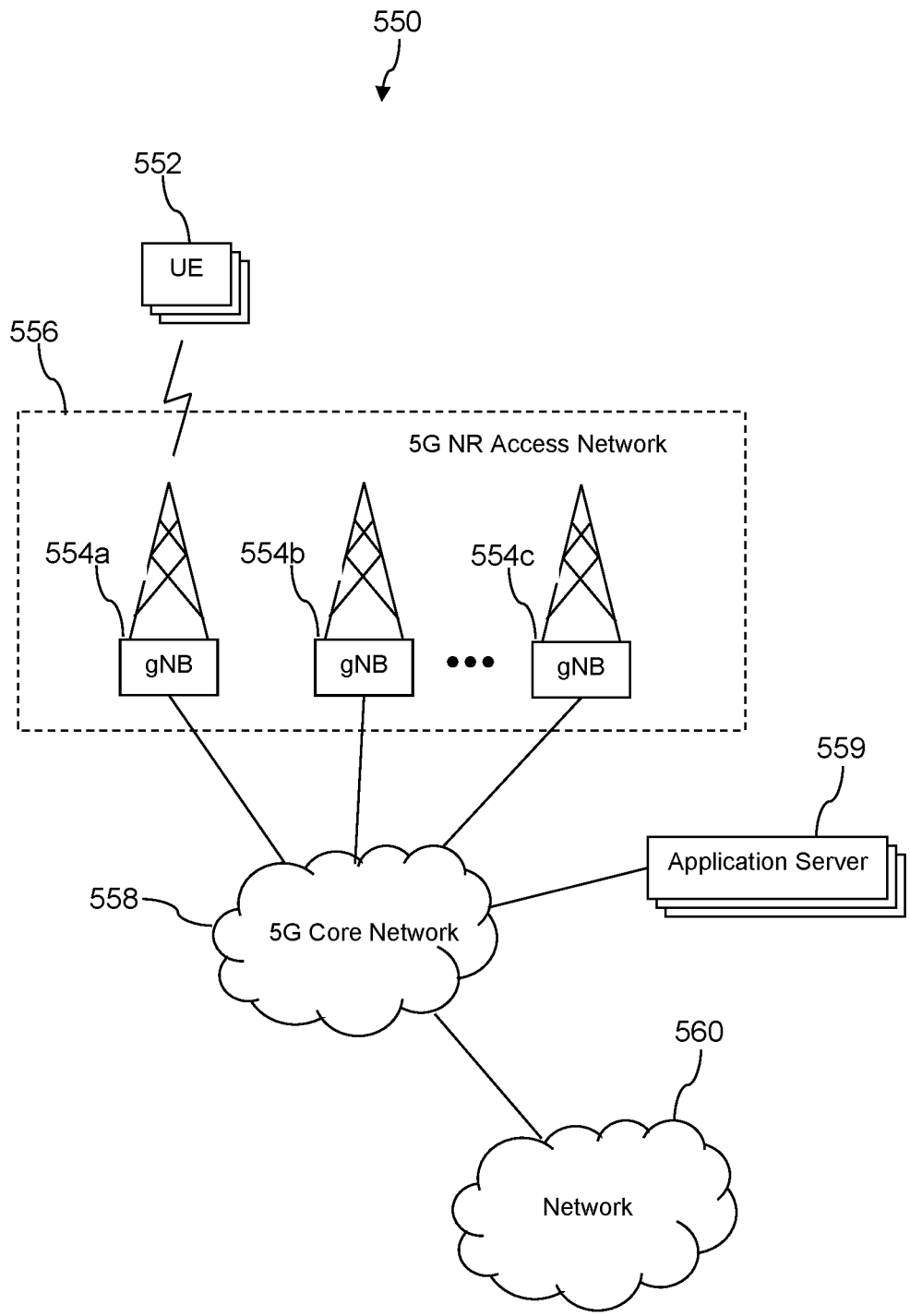
FIG. 5A and FIG. 5B are block diagrams of a 5G network according to an embodiment of the disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/ or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
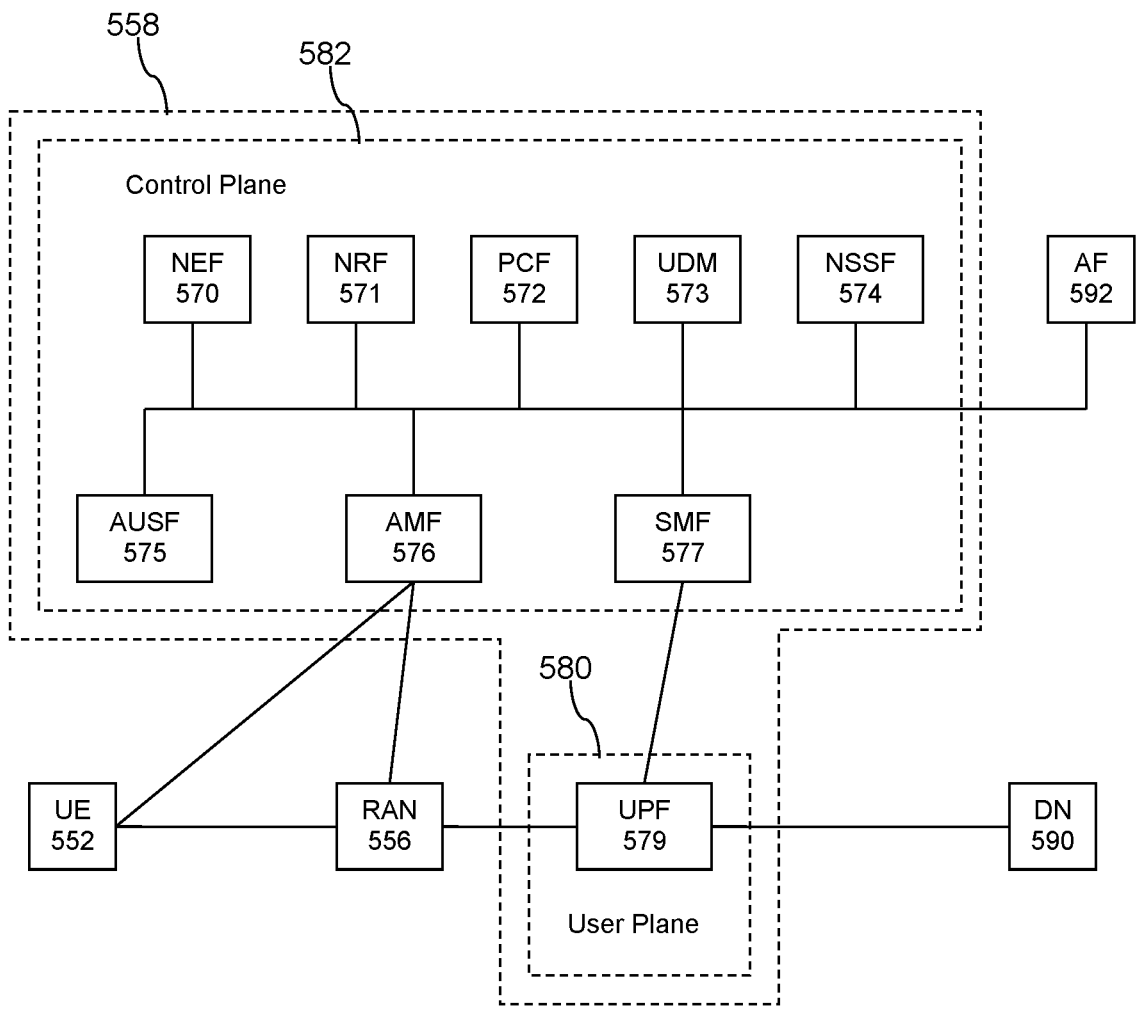

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
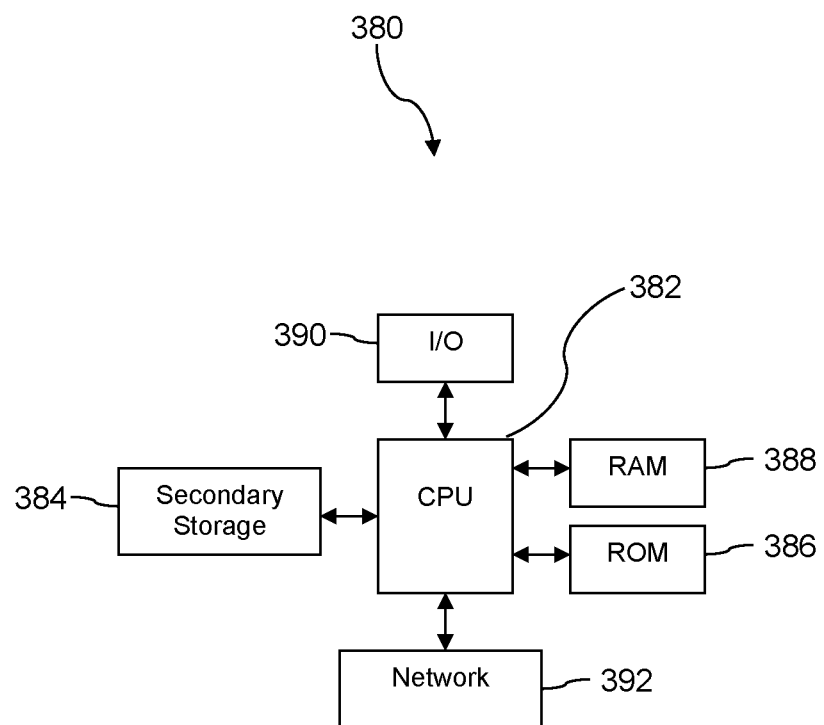
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of handing-off a plurality of user equipments (UEs) being served by a first cell site to a second cell site as a group, comprising:

analyzing by an application executing on a processor at a first cell site a plurality of radio environment measurements of a plurality of UEs receiving wireless communication coverage from the first cell site, wherein the first cell site is associated with a first multi-operator core network (MOCN);

based on analyzing the radio environment measurements, creating a UE group by the application by adding a new UE group entry by the application to a UE groups list data structure in a memory of the first cell site;

adding a first user equipment (UE) and at least one other different UE to the UE group by the application, wherein the first UE and the at least one other different UE are different physical UEs, wherein adding the first UE to the UE group comprises creating a group pointer entry that references the new UE group entry by the application in a UE context associated with the first UE in a UE contexts list, and wherein adding at the least one other different UE to the UE group comprises creating a group pointer entry that references the new UE group entry by the application in a UE context associated with the at least one other different UE;

determining by the application that the first UE is to be handed-off;

determining by the application that the first UE is a member of the UE group receiving wireless connectivity from the first cell site;

determining radio resources consumed by the UE group by the application based on summing the radio resources provided by the first cell site that are consumed by each of the UEs that are members of the UE group;

identifying by the application a plurality of cell sites which each have sufficient idle radio resources to provide the radio resources consumed by the UE group;

for each of the plurality of cell sites identified, determining by the application a MOCN to which the cell site is associated;

selecting by the application a second cell site from among the plurality of cell sites identified that is associated with the first MOCN; and sending a handoff message by the application to the second cell site, wherein the handoff message identifies each of the UEs that are members of the UE group, whereby the first cell site hands-off the plurality of UEs that are members of the UE group as a group to the second cell site.

2. The method of claim 1, wherein the first UE is a physical UE.

3. The method of claim 2, wherein the first UE is one of be a mobile phone, a smart phone, a personal digital assistant (PDA), a wearable computer, a headset computer, a laptop computer, a notebook computer, a tablet computer, or an Internet of things (IoT) device.

4. The method of claim 1, wherein the UE group comprises the first UE and at least one other virtual UE that is supported on the same physical UE that supports the first UE.

5. A cell site configured to perform group user equipment (UE) handoffs, comprising:
- an antenna set;
- a radio transceiver coupled to the antenna set;
- a non-transitory memory;
- a processor communicatively coupled to the non-transitory memory and to the radio transceiver; and
- an application stored in the non-transitory memory that, when executed by the processor:
  - determines that a first user equipment (UE) receiving a wireless link from the radio transceiver is to be handed-off,
  - determines that the first UE is a member of a UE group receiving wireless connectivity from the radio transceiver by reading a UE context entry associated to the first UE in a UE contexts list data structure stored in the non-transitory memory, by determining that the UE context entry associated to the first UE comprises a UE group pointer entry that references a UE group entry in a UE groups list data structure stored in the non-transitory memory, by reading the UE group entry referenced by the UE group pointer entry, and by determining that the UE group entry referenced by the UE group pointer entry is associated with the UE group, wherein the UE group comprises the first UE and at least one other different UE,
  - determines radio resources provided by the radio transceiver consumed by the UE group,
  - identifies a second cell site that has sufficient idle radio resources to provide the radio resources consumed by the UE group, and
  - sends a handoff message via the radio transceiver to the second cell site, wherein the handoff message identifies each of the UEs that are members of the UE group, whereby the plurality of UEs that are members of the UE group are handed-off as a group to the second cell site.

6. The cell site of claim 5, wherein the cell site provides wireless communication links according to a 5G, a long-term evolution (LTE), a code division multiple access (CDMA), or a global system for mobile communications (GSM) telecommunication protocol.

7. The cell site of claim 5, wherein the application determines radio resources consumed by the UE group by determining the megabits per second of data throughput consumed by the first UE and by the at least one other different UE and summing these data throughputs.

8. The cell site of claim 5, wherein the first UE and the at least one other different UE that are members of the UE group are virtual UEs supported by the same physical UE.

9. The cell site of claim 5, wherein the application further deletes the UE group entry from the UE groups list data structure after the each of the UEs that are members of the UE group are handed-off as a group to the second cell site.

10. A method of handing-off a plurality of user equipments (UEs) being served by a first cell site to a second cell site as a group, comprising:
- determining by an application executing on a processor at a first cell site that a first user equipment (UE) is to be handed-off;
- in response to determining that the first UE is to be handed-off, determining by the application that the first UE is a member of a UE group receiving wireless connectivity from the first cell site by:
  - reading by the application a UE context entry associated with the first UE in a UE contexts list data structure stored by the first cell site;
  - reading a group pointer entry in the UE context entry associated with the first UE by the application, whereby the application determines that the first UE is a member of a UE group; and
  - reading by the application a UE group entry in a UE groups list data structure stored by the first cell site, wherein the application accesses the UE group entry based on reading the group pointer entry, and wherein the UE group entry comprises a first UE context pointer that references the UE context of the first UE and at least one other UE context pointer that references at least one UE context associated with at least one other different UE, whereby the application determines that the at least one other different UE is a member of the UE group;
- determining radio resources consumed by the UE group by the application based on summing the radio resources provided by the first cell site that are consumed by each of the UEs that are members of the UE group;
- identifying by the application a second cell site that has sufficient idle radio resources to provide the radio resources consumed by the UE group; and
- sending a handoff message by the application to the second cell site, wherein the handoff message identifies each of the UEs that are members of the UE group, whereby the first cell site hands-off the plurality of UEs that are members of the UE group as a group to the second cell site.

11. The method of claim 10, wherein the first UE is one of be a mobile phone, a smart phone, a personal digital assistant (PDA), a wearable computer, a headset computer, a laptop computer, a notebook computer, a tablet computer, or an Internet of things (IoT) device.

12. The method of claim 10, wherein the first UE is a physical UE and the at least one other different UE is a virtual UE supported by a physical UE different from the first UE.

13. The method of claim 10, wherein the cell site provides wireless communication links to the first UE and to the at least one other different UE according to a 5G, a long-term evolution (LTE), a code division multiple access (CDMA), or a global system for mobile communications (GSM) telecommunication protocol.

14. The method of claim 10, wherein the application determines radio resources consumed by the UE group by determining the megabits per second of data throughput consumed by the first UE and by the at least one other different UE and summing these data throughputs.

\* \* \* \* \*